United States Patent [19]

Barbier et al.

[11] Patent Number: 4,805,397

[45] Date of Patent: Feb. 21, 1989

[54] COMBUSTION CHAMBER STRUCTURE FOR A TURBOJET ENGINE

[75] Inventors: Gérard Y. G. Barbier, Morangis; Gérard J. P. B. Laboure, Avon; Michel A. A. Desaulty, Vert-Saint-Denis; Francois Duchene, Melun; Pascal M. Trouillot, Courbevoie, all of France

[73] Assignee: Societe Nationale d'Etude et de Construction de Moteurs d'Aviation (SNECMA), Paris, France

[21] Appl. No.: 56,884

[22] Filed: Jun. 3, 1987

[30] Foreign Application Priority Data

Jun. 4, 1986 [FR] France ............................... 86 08015

[51] Int. Cl.[4] ............................ F02C 7/20; F02C 1/00

[52] U.S. Cl. ..................................... 60/39.32; 60/759; 60/760

[58] Field of Search ...................... 60/760, 39.32, 757, 60/754, 759, 752; 431/351, 352

[56] References Cited

U.S. PATENT DOCUMENTS

| | | | |
|---|---|---|---|
| 3,385,054 | 5/1968 | Land | 60/757 |
| 3,545,202 | 12/1970 | Batt et al. | 60/757 |
| 3,899,876 | 8/1975 | Williamson | 60/757 |
| 4,302,941 | 12/1981 | DuBell | 60/757 |
| 4,512,159 | 4/1985 | Memmen | 60/39.32 |
| 4,555,901 | 12/1985 | Wakeman et al. | 60/39.32 |
| 4,614,082 | 9/1986 | Sterman et al. | 60/39.32 |
| 4,720,979 | 1/1988 | Mink | 60/39.32 |

FOREIGN PATENT DOCUMENTS

| | | | |
|---|---|---|---|
| 0216721 | 4/1987 | European Pat. Off. | 60/39.32 |
| 2023415 | 11/1969 | France . | |
| 2422035 | 4/1979 | France . | |

*Primary Examiner*—Louis J. Casaregola
*Assistant Examiner*—Timothy S. Thorpe
*Attorney, Agent, or Firm*—Bacon & Thomas

[57] ABSTRACT

A combustion chamber for a turbojet engine is disclosed which utilizes double walled construction. Hot walls are attached to adjacent cold walls solely by an orifice member which defines an orifice to supply primary of dilution air to the combustion chamber. The attachment allows relative radial movement of the hot walls with respect to the cold walls so as to accommodate the thermal expansion and contraction of the hot walls. The sleeves forming the walls also cooperate so as to provide an internal cooling film on the interior surface of the hot walls. Convection cooling may also be utilized between the walls to prevent structural damage due to high temperatures.

10 Claims, 2 Drawing Sheets

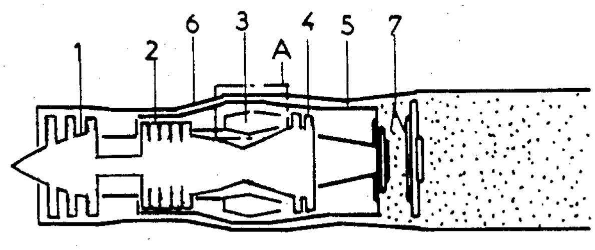
FIG. 1
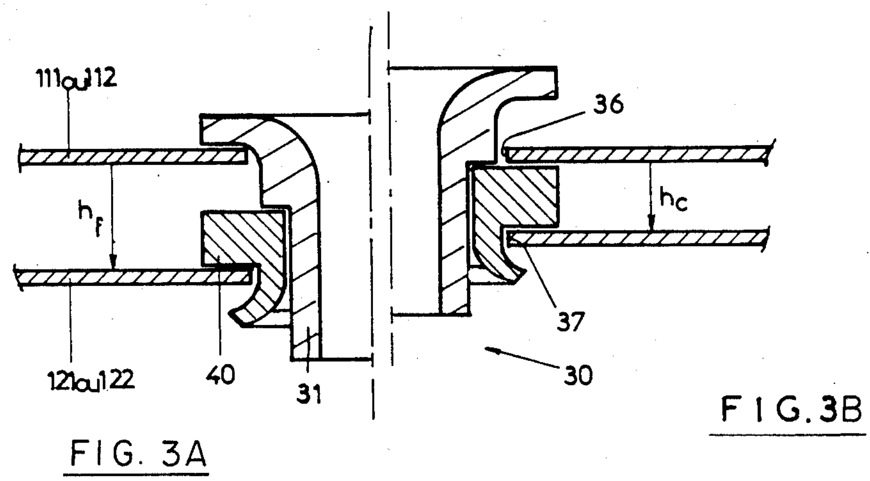
FIG. 3A
FIG. 3B
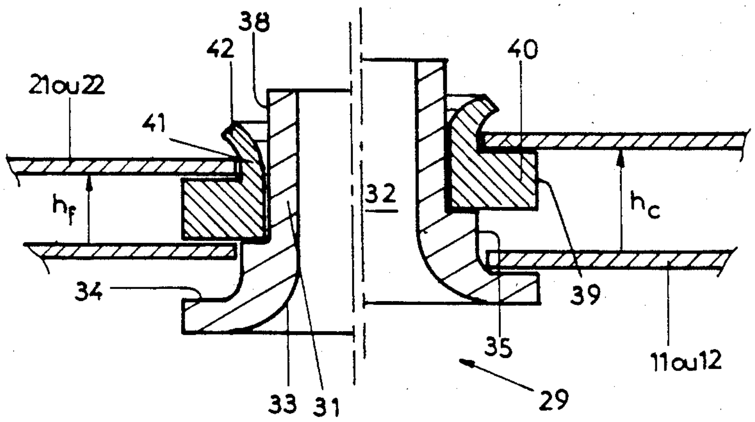
FIG. 4A
FIG. 4B

COMBUSTION CHAMBER STRUCTURE FOR A TURBOJET ENGINE

BACKGROUND OF THE INVENTION

The power output of a turbojet engine is directly proportional to the turbine intake temperature. Presently, turbojet engines operate with pre-turbine temperatures approximating 1,800° K. However, the specific fuel consumption of the turbojet engine, which is very high at those operational temperatures, decreases as the engine compression ratio increases. Thus, in order to maintain or increase the specific fuel consumption with the high turbine intake temperatures, it is necessary to raise the compression ratio of the engine.

These two parameters have necessitated the construction of double walled combustion chambers in order to provide the necessary thermal protection to the chamber and to increase their service life. A typical example of such double walled combustion chambers is shown in U.S. Pat. No. 4,704,874.

Cooling may be provided to the double walled combustion chambers by external convection by itself, or combined with a film cooling effect. The film cooling effect utilizes a film of air directed along the interior surface of the combustion chamber to avoid direct contact between the wall and the combustion chamber gases. The film is generated by secondary air intakes through the combustion chamber wall. Since the film cooling layer becomes increasingly diluted in the downstream direction, several such secondary air intakes must be arrayed along the length of the chamber to replenish the diluted film air.

Convection cooling may also be used between the two walls of the double walled conbustion chamber either by using air flowing in the same direction as the combustion gases, or in counterflow. In the case of counterflow convection cooling, the same stream of air may be used to form the peripheral cooling film on the inner wall of the combustion chamber after it has been used to cool the chamber by convection. However, such systems have typically required substantial air flow to achieve significant convection cooling.

The double walled construction has also presented problems, since the inner wall exposed to the combustion chamber gases (the hot wall) undergoes substantial expansion and contraction with respect to the outer or cold wall, which is not exposed to such high temperatures. Therefore, some means must be provided to attach the inner or hot wall to the outer or cold wall so as to allow relative movement due to the thermal expansion of the hot wall. U.S. Pat. No. 4,302,941 to Dubell discloses a combustion chamber structure in which an inner or hot wall is attached to an outer wall by means of bolts which provide relative radial movement between the inner and outer walls. Longitudinal strips attached to the outer surface of the inner or hot wall guide the convection air and serve as a limit to the radial movement of the inner wall with respect to the outer wall. However, while these strips are useful in directing the convection air, they generate substantial turbulence or wakes in the cooling film on the interior surface of the inner wall so as to reduce the effectiveness of this film. Also, the air dilution intake apertures being located directly at the film discharge also serve to degrade the effectiveness of the film.

Another form of double walled combustion chamber construction is shown in French Pat. No. 2,023,415. This structure utilizes staggered sleeves forming the inner, hot wall which are fixed in place at their upstream edge. The downstream edges of the sleeves have stops which limit the radial movement of the sleeves relative to an outer or cold wall. Ths combustion chamber construction utilizes same direction convection cooling with an internal cooling film, however, the film thickness is not entirely controlled in relation to the hot wall expansion. Also, the stops located on the downstream edges of the sleeves introduce turbulence into the cooling film so as to further degrade its uniformity and effectiveness.

French Pat. No. 2,422,035 discloses a combustion chamber construction in which the perturbations of the cooling film due to the dilution air intake orifices are limited by leaving a free space between the inner, hot sleeve and the tubular dilution orifices. This structure provides a downstream lip on the inner end of the dilution orifice tube in order to reestablish the cooling film that had been interrupted by the tube.

SUMMARY OF THE INVENTION

The present invention relates to turbojet engine combustion chambers and, more particularly, such chambers having double walled construction with at least one external or cold wall and one inner or hot wall. The walls may be constructed of several sleeves welded together. Means are provided for attaching the inner, hot wall to the outer, cold wall so as to allow for relative radial movement of the inner or hot wall due to thermal expansion and contraction. The air dilution orifice structure serves to attach the inner and outer walls together so as to permit this radial movement, while at the same time fixing their relative positions axially. The orifice structure extends through both the outer and inner walls and defines an orifice which may be utilized to introduce either primary or dilution air into the combustion chamber.

An object of the present invention is to provide a double walled combustion chamber having improved cooling by using impact, multi-perforations, convection and film cooling thereby substantially reducing the flows of the prior art devices.

Another object of the invention is to provide a double walled combustion chamber having a relatively simple design to limit the mass of the structure and to further facilitate the disassembly of the inner or hot wall sleeves.

A further object of the invention is to provide better control of the formation and the optimization of the cooling film by controlling the respective positions of the upstream portions of each of the hot sleeves and the downstream strips of each adjacent, preceding hot sleeve as a function of the expansion of the hot sleeve when the combustion chamber is in operation.

A further object of the invention is to simplify the fastening of the inner or hot wall sleeves so as to mount them in a manner to permit radial play relative to the cold wall by a particular type of mixing orifice means.

A feature of the invention is to provide an orifice member having a first cylindrical portion and a second cylindrical portion, the portions defining a shoulder at their junction. The orifice member also has a flange which may rest against the outer surface of the cold wall, but is not rigidly attached thereto. An annular member is attached to the orifice member at the second cylindrical portion, the annular member having a second flange extending therefrom which is disposed between the inner and outer walls. The annular member may be attached to the orifice member by welding it to the second cylindrical portion.

The length of the first cylindrical portion exceeds the thickness of the inner or hot wall such that the annular member, which is attached to the inner or hot wall, and the remaining structure of the orifice means may move in a radial direction relative to the outer or cold wall.

In another feature of the invention, the sleeves of the outer wall define a plurality of grooves which are engaged by straps formed on the inner or hot wall so as to attach the inner walls to the outer walls in a floating manner.

A cooling film for the interior surface of the hot walls may be provided by arranging the geometry of the sleeves forming the hot wall such that the upstream rim of each sleeve cooperates with a downstream edge of the sleeve immediately preceding it in an upstream direction so as to generate the cooling film. The height of the slot through which the film is generated is controlled during the radial movement of the inner wall and by the angle of the edge of the upstream sleeve.

BRIEF DESCRIPTION OF THE DRAWINGS

FIG. 1 is a schematic sectional view of a turbojet engine incorporating the combustion chamber according to the invention.

FIG. 3A is an enlarged, partial cross-sectional view showing the double walled construction and the mixing orifice of the outer double wall in FIG. 2 under cold conditions.

FIG. 3B is an enlarged, partial sectional view showing the mixing orifice and double walled construction of the outer double wall of FIG. 2 under hot operating conditions.

FIG. 4A is an enlarged, partial sectional view showing the mixing orifice and double walled construction of the inner double wall shown in FIG. 2 under cold conditions.

FIG. 4B is an enlarged, partial sectional view showing the mixing orifice and double walled construction of the inner double wall of FIG. 2 under hot operating conditions.

DETAILED DESCRIPTION OF THE PREFERRED EMBODIMENT

Figure 2:
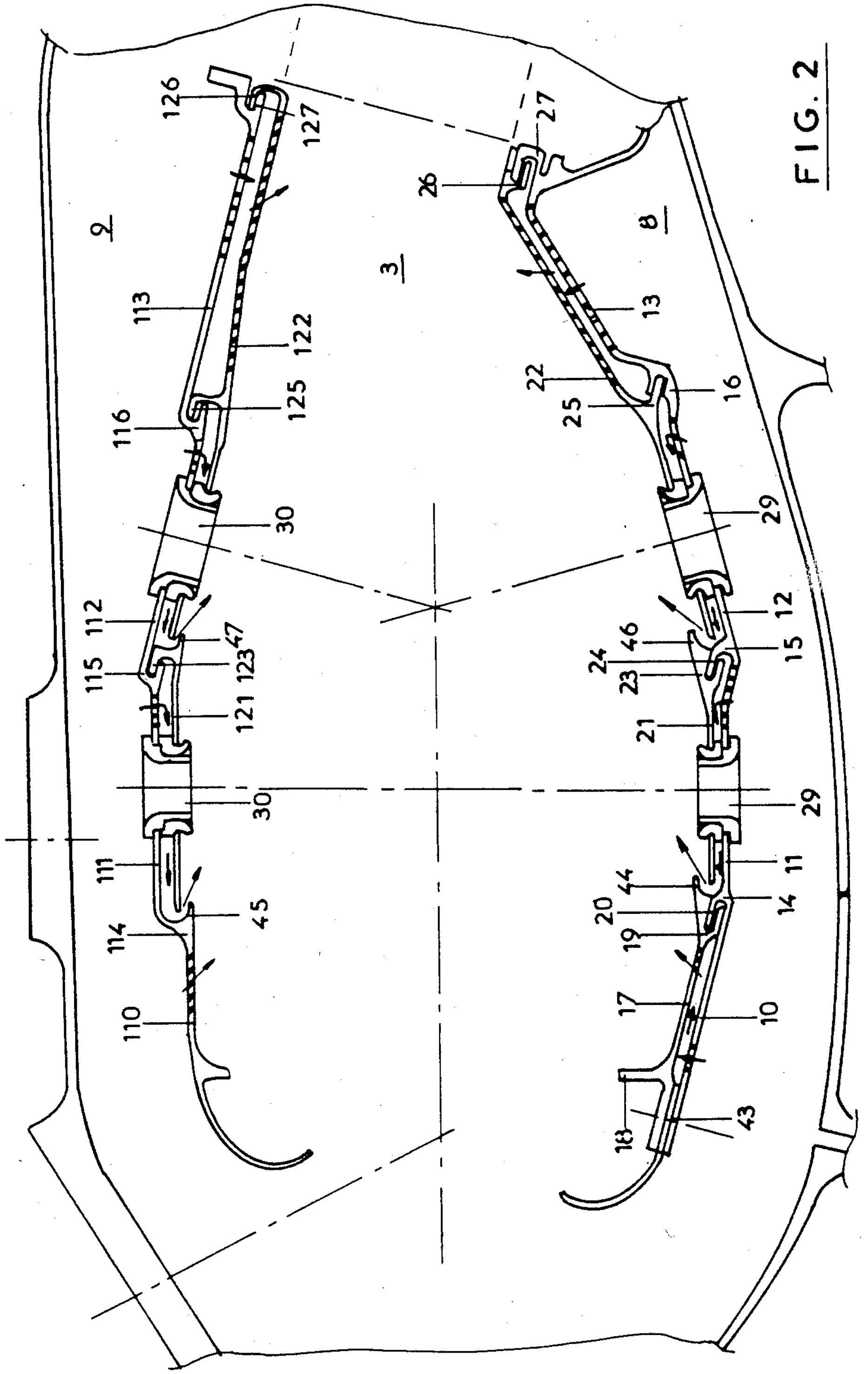
FIG. 2 is a partial, longitudinal cross-sectional view of the combustion chamber indicated by A in FIG. 1.

FIG. 1 shows a schematic diagram of a turbojet fan engine having a low dilution rate with a low pressure compressor 1 which compresses the air taken in through the engine intake in the conventional manner. The discharge flow from the low pressure compressor 1 is divided into a primary and a secondary air flow with the primary air flow then being compressed by a high pressure compressor 2 before being mixed with pressurized fuel in an annular combustion chamber 3. As is well known in the art, the air/fuel mixture is burned to impart combustion energy to the engine.

The gases issuing from the combustion chamber 3 drive a turbine 4 which, in turn, is operatively connected to drive the compressors 1 and 2. As the gases are accelerated at the discharge of the turbine, the hot flow emanating from the combustion chambers is mixed with the secondary or cold flow which passes through the annular passage defined between the intermediary casing 5 and the outer engine casing 6. The gases are then ejected from the engine or pass through an afterburner device 7.

FIG. 2 is a longitudinal sectional view of the detail A shown in FIG. 1. The combustion chamber 3 according to the invention is a double walled annular chamber consisting of a double inner wall 8, the one nearest the engine's longitudinal axis, and a double external wall 9 which is radially outward from the double inner wall 8. Each of the double walls 8 and 9 comprises an inner chamber wall exposed to the combustion gases and designated the hot wall, and an external wall exposed to the flow of primary air which is cooler than the combustion gases and designated the cold wall. Hereinafter the expressions "inner wall" and "outer wall" shall be used to denote the double walled structure while the terms "hot wall" and "cold wall" will be utilized to designate the walls exposed to the hot gases of the combustion chambers, and those exposed to the cooler primary air.

The inner cold chamber wall consists of four sleeves denoted by numbers 10, 11, 12 and 13 while the outer cold chamber walls consist of four sleeves denoted by numerals 110, 111, 112 and 113. The sleeves are denoted from the upstream and toward the downstream end and have enlarged portions 14, 15 16 and 114, 115 and 116, respectively which cooperate with the inner and outer hot chamber walls to form a peripheral cooling film on the interior surface of the hot walls. The inner hot wall consists of a fixed sleeve 17 which is welded or otherwise attached to the upstream end 18 of the combustion chamber, the sleeve 17 defining an annular groove 19 in which strap 20 of enlarged portion 14 of the cold wall is engaged. Two inner hot sleeves 21 and 22 are attached to the inner cold wall so as to be movable in a radial direction relative thereto by means which will hereinafter described in more detail.

The outer hot wall comprises sleeves 121 and 122 which are also attached to the outer cold wall so as to be movable in a radial direction relative thereto.

Hot wall sleeve 21 defines a groove 23 in which strap 24 of enlarged portion 15 of the cold wall is engaged. Sleeve 22 defines straps 25 and 26 which engage an annular groove of the enlarged portion 16 of the cold wall and a second groove 27 formed on the downstream side of the inner cold wall. Sleeves 121 and 122 are attached in a similar manner to the outer cold wall by straps 123, 125 and 126 engaging the annular grooves formed in enlarged portions 115, 116 and 127 of the outer wall.

Sleeves 21, 22, 121 and 122 have floating upstream supports and are positioned on the respective cold walls solely by the mixing orifice members 29 and 30 which supply the primary zone and the dilution zone with combustion air. Each mixing orifice member 29 and 30 has a cylindrical portion 31 defining a central bore 32 which flares outwardly at 33 so as to form a flared-hole mixing air intake. Flange 34 defines a shoulder which may rest against the outer surface of cold wall 11 or 12 as well as cold wall 111 or 112. A first cylindrical portion 35 extends through an opening 36 formed in the cold wall, while a second cylindrical portion 38 extends through openings 37 defined by the hot walls. The diameter of the second cylindrical portion 38 is less than than of the first cylindrical portion 35 so as to define a radially extending shoulder at their junction.

An annular member 39 having a radially extending flange 40 and a tubular portion 41 is attached to the cylindrical portion 38 of the mixing orifice member such that it bears against the shoulder between the first and second cylindrical portions. The flange 40 is disposed between the hot and cold walls as shown in FIGS. 3 and 4. The end 42 of tubular portion 41 is flanged outwardly on the hot wall 21, 22 or 121, 122 once the wall has been assembled. The annular member 39 is rigidly joined to the orifice member 29, 30 by a weld bead deposited between the flanged edge 42 and the second cylindrical portion 38. The radial thickness of flange 40 determines the minimum distance between the hot and cold walls, whereas the length of cylindrical portion 35 added to the radial thickness of the flange 40 determines the maximum radial distance between the hot and cold walls.

As shown in FIG. 3 regarding the outer chamber wall, the heating of the hot wall during combustion chamber operation tends to bring the hot and cold walls closer together. As shown in the left portion of FIG. 3, the hot and cold walls are separated by a distance $h_f$ before combustion chamber operations. As the hot wall temperature increases, the distance between the hot and cold walls decreases to $h_c$ as indicated in the right poriton of FIG. 3 ($h_c$ is less than $h_f$). $h_c$ in this instance is equal to the radial thickness of flange 40.

As illustrated in FIG. 4, the hot and cold walls of the inner double walled construction 8 will be separated by a distance $h_f$ prior to operation of the combustion chamber which is equal to the radial thickness of flange 40. As the temperature of the hot wall increases, its expansion will tend to move it away from the cold wall to a distance of $h_c$ as illustrated in the right portion of FIG. 4. The distance $h_c$ at its maximum will equal the length of first cylindrical portion 35 and the radial thickness of flange 40.

Therefore, by determining the dimensions of the orifice member and the annular member, the desired distance $h_f$ in the cold state and the desired value $h_c$ in the hot state can be set.

The combustion chamber is assembled by initially placing the orifice member 30 in outer cold walls 111 and 112. Annular member 39 is placed over the second cylindrical portion 38 and sleeve 121 is attached by hooking strap 123 into the groove formed in enlarged portion 115 such that tubular portion 41 extends through opening 37. The end 42 is flared back over the sleeve so as to fix it in position. The annular member 39 is then welded to cylindrical portion 38 to complete the construction. The same procedure is carried out with respect to sleeve 122.

Sleeves 21 and 22 of the inner wall 8 are attached in the same manner to cold walls 11, 12 and 13 by using orifice members 29. The inner wall is completed by hooking straps 20 into annular groove 19 formed on sleeve 17 and by fastening bolts 43 onto the upstream portion of the combustion chamber.

The combustion chamber walls may be cooled by combining an external comvection air flow with the cold walls through multi-perforations in cold walls 10–13 and 110–113 by means of a counterflow between the cold walls and the hot walls. A peripheral cooling film may also be generated so as to flow along the interior surface of hot sleeves 21, 22, 121 and 122. The enlarged portions 19 and 114 of the sleeves 17 and 110, respectively, define downstream portions 44 and 45 which cooperate with the adjacent upstream edges of sleeves 21 and 121 so as to form the cooling film on the primary sleeves. The air flow is indicated by the arrows in FIG. 2. Similarly, the downstream edge of primary hot sleeves 21 and 121 define strips 46 and 47 which cooperate with the adjacent upstream edge of the hot dilution By radially positioning the hot walls on the cold walls by the orifice members 29 and 30, optimal cooling efficiency may be achieved by the cooling films since the geometric shape which determines the air flow can thereby be controlled. Also, the slot height through which the air film emanates can be controlled since the thickness of the downstream portions 44–47 can be determined such that a slight expansion of the portions will not significantly change the film slot height.

By fastening the hot walls on the cold walls by means of the orifice members, it is possible to ensure the circumferential homogeneity in the cooling film by avoiding the generation of wakes or turbulence due to the expansion-limiting stubs of the prior art devices. The disclosed fastening method also reduces upstream wakes by progressively accelerating the discharge in relation to a control change in the cross-section in the final portion of the cooling film.

Because the peripheral cooling film upstream of dilution sleeves 22 and 122 is insufficient to remain totally effective over the lengths of the sleeves, the converging portion is cooled between the straps 25, 27, 125 and 126, respectively both by impact cooling and by multi-perforation of the hot wall, as shown in FIG. 2.

The assembly method of the hot walls on the cold walls according to the invention achieves the optimum compromise between the various cooling modes employed, while making the double-wall combustion chamber of low weight and relatively simple design having easy assembly or disassembly.

The foregoing description is provided for illustrative purposes only and should not be construed as in any way limiting this invention, the scope of which is defined solely by the appended claims.

What is claimed is:

1. In a turbojet engine having a combustion chamber, the improvement comprising:

(a) first and second double wall structures defining transverse limits of the combustion chamber, each double wall structure comprising:
  (i) a hot wall structure exposed to high temperature gases within the combustion chamber; and,
  (ii) a cold wall structure; and, (b) means to attach the hot wall structure to the cold wall structure so as to permit transverse movement of the hot wall with respect to the cold wall between minimum and maximum spacing while preventing relative longitudinal movement therebetween, the means comprising:
  (i) an orifice member defining an air orifice therethrough, extending through the cold wall and the hot wall so as to allow air to flow into the combustion chamber, the orifice member having a first generally cylindrical portion, a second generally cylindrical portion, and a first flange extending radially outwardly from the first generally cylindrical portion; and,
  (ii) an annular member attached to the second generally cylindrical portion of the orifice member and to the hot wall, the annular member having a second flange extending radially therefrom disposed between the hot wall and the cold wall, and spaced from the first flange such that a length of the first generally cylindrical portion extending between the first and second flanges defines the maximum amount of transverse movement between the hot and cold walls and a thickness of the second flange defines the minimum spacing between the hot and cold walls.

2. The improved combustion chamber according to claim 1 further comprising means to fixedly attach the annular member to the second cylindrical portion of the orifice member.

3. The improved combustion chamber according to claim 2 wherein the annular member is welded to the second cylindrical portion of the orifice member.

4. The improved combustion chamber according to claim 2 wherein the orifice member is oriented such that an axis of the air orifice extends generally perpendicular to the hot and cold walls.

5. The improved combustion chamber according to claim 1 wherein the cold wall defines a plurality of grooves and further comprising a plurality of straps on the hot wall locates so as to engage the grooves.

6. The improved combustion chamber according to claim 1 wherein the hot wall comprises a plurality of sleeves.

7. The improved combustion chamber according to claim 6 means on adjacent sleeves to form a cooling air film on an interior surface of the hot wall.

8. The improved combustion chamber according to claim 7 wherein an upstream sleeve defines an enlarged, curved portion which cooperates with an edge of an adjacent downstream sleeve so as to define an outlet slot for the cooling air film.

9. The improved combustion chamber according to claim 1 wherein the cold wall structure defines a plurality of perforations to provide impact cooling for the hot wall structure.

10. The improved combustion chamber according to claim 1 further comprising means to provide a cooling air flow between the hot and cold wall structure so as to cool the hot wall by counter-flow convector.

* * * * *

UNITED STATES PATENT AND TRADEMARK OFFICE
CERTIFICATE OF CORRECTION

PATENT NO. : 4,805,397

DATED : February 21, 1989

INVENTOR(S) : Gerard Y. G. BARBIER ET AL

It is certified that error appears in the above-identified patent and that said Letters Patent is hereby corrected as shown below:

Column 1, line 21, patent number should be 4,104,874.

Column 4, line 36, before "described" insert --be--.

Column 4, line 64, delete "than" and insert --that--.

Column 5, lines 22 - 23, delete "poriton" and insert --portion--.

Column 6, line 3, after "dilution" insert --sleeves--.

Claim 7, line 5, before "means" insert --further comprising--.

Signed and Sealed this

Fifteenth Day of August, 1989

*Attest:*

DONALD J. QUIGG

*Attesting Officer*

*Commissioner of Patents and Trademarks*